INVENTORS
George F. Ritter, Jr. and
Frank J. Carlson
BY Nobbe & Swope
ATTORNEYS

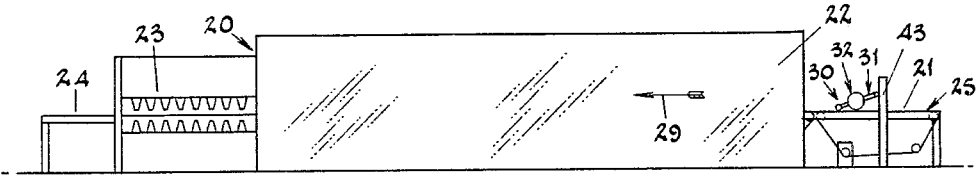
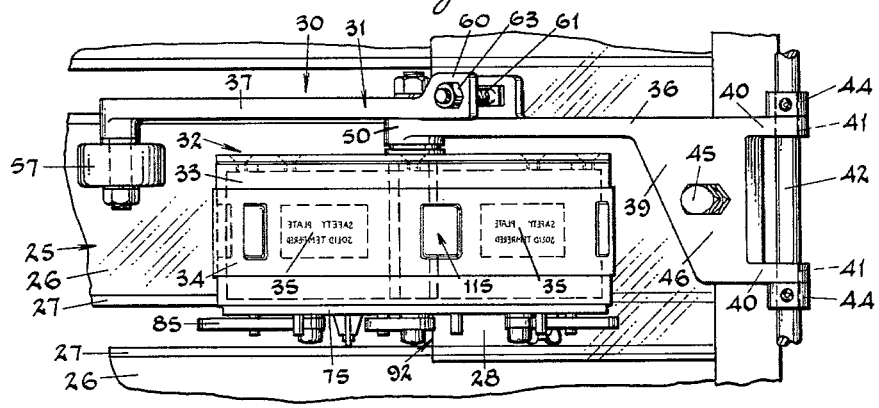
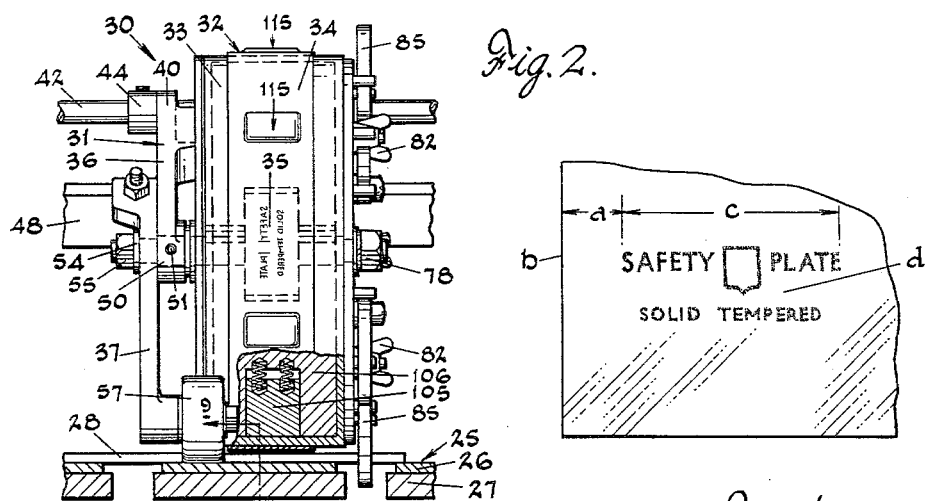
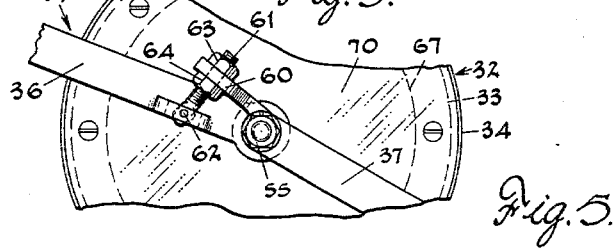

Jan. 18, 1966  G. F. RITTER, JR., ET AL  3,229,624
MARKING APPARATUS
Filed Oct. 26, 1961  3 Sheets-Sheet 3
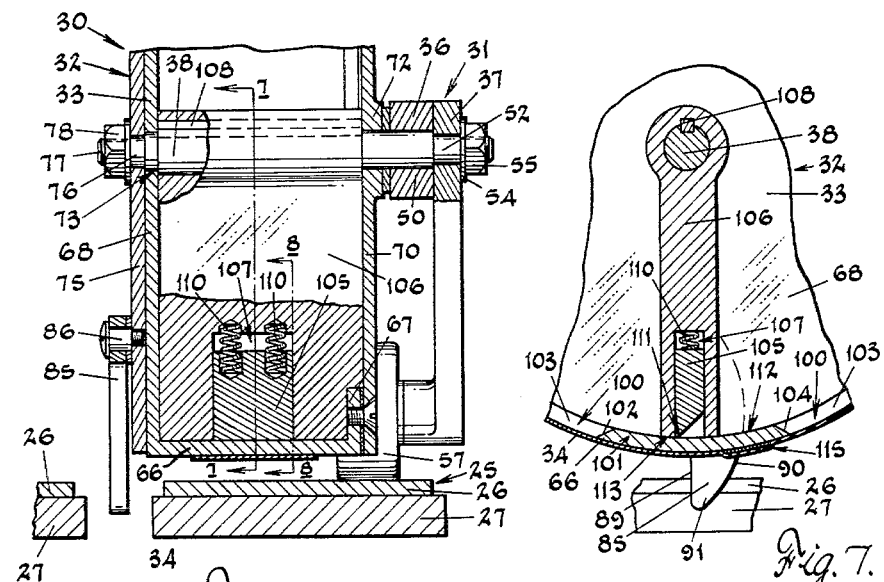
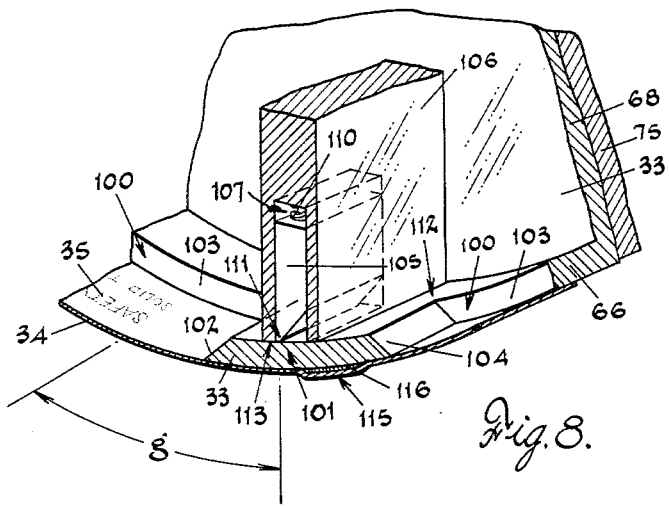
INVENTORS
George F. Ritter, Jr. and
BY Frank J. Carson
Nobbe & Swope
ATTORNEYS

United States Patent Office 3,229,624
Patented Jan. 18, 1966

3,229,624
MARKING APPARATUS
George F. Ritter, Jr., and Frank J. Carson, Toledo, Ohio, assignors to Libbey-Owens-Ford Glass Company, Toledo, Ohio, a corporation of Ohio
Filed Oct. 26, 1961, Ser. No. 147,838
5 Claims. (Cl. 101—35)

The present invention relates broadly to the marking or decorating of surfaces, and more particularly to an improved apparatus for applying an identifying indicia to the surfaces of glass sheets as the sheets are moving along a predetermined path.

Although not restricted to any particular use, the apparatus of this invention has been found to be of particular utility in the printing of an identifying indicia, which may be in the form of an emblem, trademark or other insignia on glass sheets that are to be heat treated and will be herein described in that connection.

An important object of the invention therefore is to provide improved marking apparatus adapted for use with heat treating equipment for applying a frit material in the form of an identifying indicia on a sheet of glass, said frit material fusing onto the glass during the heat treatment of the glass to indicate that the glass has been so treated.

Another object of the invention is to provide marking apparatus of the above character which is automatically operable in response to movement of each of a plurality of successive glass sheets therebeneath to apply an identifying indicia to one surface thereof, with means for positioning the identifying indicia applying medium for similar operation when engaged by each successive sheet of glass.

Other objects and advantages of the invention will become more apparent during the course of the following description when taken in connection with the accompanying drawings.

In the drawings, wherein like numerals are employed to designate like parts throughout the same:

FIG. 1 is a side elevation of a glass treating furnace with which the apparatus of this invention may be employed;

FIG. 2 is an enlarged top view of one form of marking apparatus constructed in accordance with this invention;

FIG. 3 is an end view, partially in section;

FIG. 5 is a fragmentary view of the opposite side of the apparatus;

FIG. 6 is a vertical transverse sectional view taken on line 6—6 of FIG. 4;

FIG. 7 is a cross-sectional detail view taken on line 7—7 of FIG. 6;

FIG. 8 is an enlarged perspective view taken on line 8—8 of FIG. 6;

FIG. 13 is an enlarged fragmentary view of a glass sheet upon which an identifying insignia has been produced by the apparatus of this invention.

Figure 4:
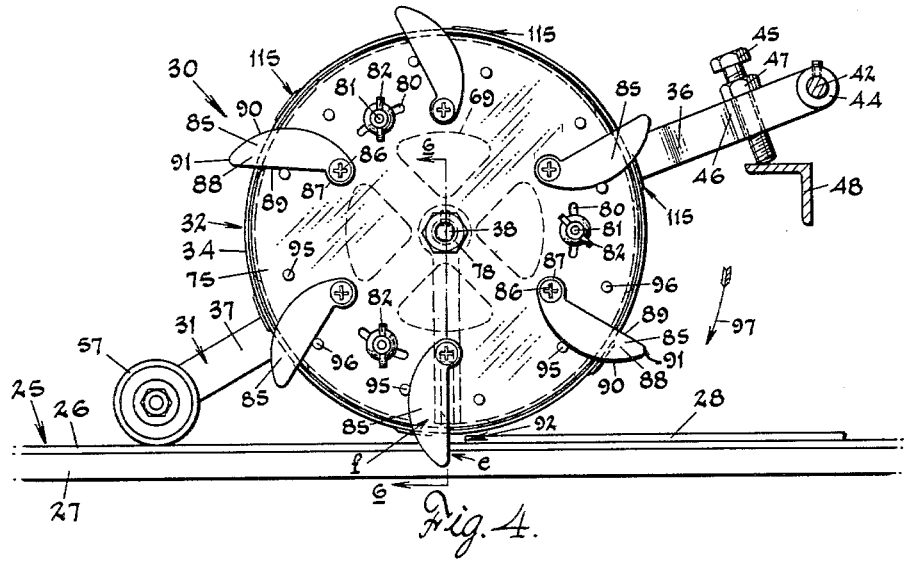
FIG. 4 is a side view of the apparatus.

Referring now to the drawings and particularly to FIG. 1, there is shown an apparatus for heat treating glass which, for the purposes of this invention, is adapted to modify the physical properties of glass sheets to render the same more resistant to breakage and, in the event of breakage, to be reduced to small particles that are incapable of inflicting serious injury to persons in the vicinity thereof. This change in the physical properties of glass is commonly known as "tempering" and is accomplished by passing the glass sheets through a furnace in which they are heated to substantially the softening point of the glass after which the heated sheets are subjected to blasts of cooling air. The rapid loss of heat in the skin layers of the glass sheet develops a compression strain in the opposed surface layers while the center of the sheet cools more slowly to establish a tension layer between the opposed surface layers. The use of glass sheets possessing these tempered characteristics has been recognized for many years in the rear windows of automobiles as well as in other commercial applications. Tempered glass sheets can be either flat or bent.

The production of bent or curved tempered glass sheets usually combines heating the sheets to properly shape the same to a desired curvature and then tempering them at the end of the bending operation and while the sheets are still in a highly heated condition. Glass sheets that have been tempered cannot be readily detected by visual inspection since their physical properties, such as optical clarity and surface quality, remain unchanged so that a tempered sheet appears the same as a sheet that has not been tempered. A primary use of the apparatus of this invention therefore resides in the marking of a glass sheet with a suitable identifying indicia or insignia prior to the heating thereof, which will permanently identify the glass sheet and the physical properties thereof. Such marking can, at the same time, be of a decorative character if desired such as an artistic design or motif or for more practical purposes serve as a commercial identification to inform purchasers and/or users as to the manufacturer of the glass.

Shown in FIG. 1 is a heat treating furnace, designated in its entirely by the unmeral 20 of the type utilized to temper glass sheets, which furnace includes a loading area 21, a heating chamber 22, a chilling or tempering area 23 and an unloading area 24. Although not shown in detail, it is to be understood that several conveyor belt systems or a plurality of rolls are employed to carry the glass sheets forwardly through the apparatus along a substantially horizontal path of movement. A conveyor 25 (FIGS. 2, 3 and 4) is used in the loading area 21; the glass sheets being placed on the horizontally disposed upper flight of the conveyor 25 and delivered therefrom onto the surface of an adjoining conveyor belt (not shown) located in the entry end of the heating chamber 22. By way of example, the conveyor 25 may consist of a plurality of endless belts 26, arranged in spaced parallel relation and trained at their opposite ends about suitable support and drive shafts. The upper flights of the belts 26 are adapted to traverse slats or rails 27 to thereby carry glass sheets, such as the sheet 28, forwardly along a substantially horizontal path as indicated by the arrow designated by the numeral 29 (FIG. 1).

A preferred embodiment of marking apparatus constructed in accordance with the invention is mounted above the conveyor 25 and is designated in its entirety by the numeral 30. Generally speaking, the marking apparatus 30 includes a frame 31 adapted to rotatably support an annular marking member, generally designated by the numeral 32, that is caused to rotate in surface contact with a sheet of glass and in so doing apply the desired marking on the upwardly directed surface thereof.

In one form of the invention, the annular marking member is in the form of a cylindrical drum 33 equipped with an endless sleeve or band 34 attached to the outer periphery of the drum and having one or more stencil areas 35 arranged in equally spaced relation around the periphery thereof and through which an ink or other marking material is directed to apply the marking in the stencil to the glass sheet. The frame 31 supports the printing drum 33 for contacting engagement with the upwardly directed surface of a glass sheet moving therebeneath; means being provided for maintaining the printing member in effective engagement with the glass surface for a portion of its rotary movement and for then raising the same out of engagement with the glass surface to properly and automatically position a following printing area on the peripheral surface of the printing drum for engagement with a subsequent sheet of glass.

More particularly, the frame 31 includes a mounting arm 36 and a supporting arm 37 that are adjustably interconnected to a horizontal shaft 38 on which the printing drum 33 is journaled for free rotation. The arm 36 is formed at its inner end with a yoke 39 (FIG. 2), the spaced legs 40 of which are provided with aligned openings 41 for receiving a support rod 42 fixedly carried by vertically disposed columns 43 (one being shown in FIG. 1) of the furnace conveyor structure. The marking device 30 can be moved along the support rod 42 to vary the position of the printing drum with respect to the path of travel of the glass sheets and secured in the desired position by the locking collars 44 slidable on the rod 42. The arm 36 is thus supported on the rod 42 for substantially free, vertical swinging movement between the lock-collars 44; the downward swinging movement thereof being restricted by a set-screw 45. The set-screw 45 is threaded through the body portion 46 of yoke 39 and upon loosening of nut 47 can be turned through said body portion 46 with its outer end bearing on a surface such as a structural member or angle 48 secured to the colums 43. The set-screw 45 serves to initially locate the frame 31 above the surface of the conveyor, which location is determined by the diameter of the printing drum 33. The effective contact of the stenciling or printing medium with the glass sheet is thus established by the angular position at which downwardly directed motion of the arm 36, or frame 31 generally is arrested when the set-screw 45 engages the structural member 48.

The outer end 50 of arm 36 is provided with a suitable opening in which the shaft 38 is received and fixed by means of a pin 51 (FIG. 3). Shaft 38 is formed with a shoulder to provide a terminal portion 52 of reduced diameter on which the support arm 37 is journaled for limited angular movement. The reduced end portion 52 of shaft 38 extends beyond the arm 37 and is threaded to receive a washer 54 and nut 55 to secure the support arm 37 with respect to the arm 36. Carried at the outer end of the support arm 37 is a ball-bearing roller 57.

As viewed in FIGS. 2 and 4, the roller 57 is positioned in fixed spaced relation to the drum 33 and rides over the surface of the adjacent conveyor belt 26. However, as will be more fully hereinafter described, when the edge of a sheet of glass engages the roller 57, the same will be lifted from the surface of the conveyor with a resultant upward swinging motion of the frame 31 thereby lifting the drum 33 above the surface of the glass. Preferably the distance between a vertical plane through the axis of roller 57 and a similar vertical plane through the axis of shaft 38 and/or drum 33 is substantially equal to the lineal distance that the peripheral surface of the printing member 32 is to traverse the surface of the glass sheet. Otherwise stated, such lineal distance will include the distance $a$ that the indicia in FIG. 13 is spaced inwardly from the edge $b$ of the glass sheet 28 and the distance $c$ which is equal to the length of the marking area $d$. The distance $a$ will, of course, vary depending upon the distance of the marking area from the edge $b$ of the glass sheet while the distance $c$ will vary depending upon the length of the marking area.

The actual position of the roller 57 with reference to the drum 33 and the length of glass sheet passing therebeneath before engagement with the roller can also be adjusted through slight angular movement of the support arm 37 relative to the mounting arm 36. For this purpose, the arm 37, as shown in FIGS. 3 and 5, is provided with a slotted end 60 adapted to receive a screw 61 pivoted at one end to a pin 62 secured in the arm 36. The screw 61 is provided with lock-nuts 63 and 64 above and below the end 60 of arm 37. Adjustment of the lock-nuts along screw 61 will result in a change in angular relation between the arms 36 and 37 as the arm 37 pivots on the reduced end portion 52 of shaft 38. This will result in swinging the roller 57 upwardly or downwardly about the axis of the shaft 38 to thereby alter the actual point at which the edge of the glass sheet engages said roller as well as the upward distance the frame 31 and drum 33 are lifted when the roller traverses the surface of the glass sheet.

Referring now to the stenciling and/or printing member 32. As viewed in FIGS. 2, 3, 4 and 6, the drum 33 is hollow and is formed with a peripheral wall 66, a relatively narrow inwardly directed flange 67 at one side and an oppositely disposed wall 68 provided with a plurality of radially disposed, wedge-shaped slots 69. Secured to the relatively narrow flange by means of screws is a metal plate 70; said plate 70 having a hub 72 adapted to receive the shaft 38 therethrough, which also passes through an aligned opening 73 in wall 68. Secured to the wall 68 outwardly thereof is a mounting plate 75 having an axially disposed opening in which is received the reduced end portion 76 of shaft 38. The extreme end 77 of shaft 38 is threaded to receive securing nut 78.

For purposes to be more fully hereinafter disclosed, the plate 75 is provided with arcuate slots 80 through which screws 81 are passed, said screws being secured in the wall 68 of drum 33 (FIG. 4). By means of wing nuts 82, the plate 75 is fixed with respect to wall 68 so as to rotate as a unit with the drum. However, upon loosening of the wing nuts, the plate 75 can be rotated relative to the wall 68.

As indicated above the outer periphery of the drum rolls along the upper surface of the glass sheets to bring the printing members into contact therewith. To prevent any smearing of the mark being printed, it will be appreciated that there can be no relative movement between the glass sheet and the drum periphery. In other words, the peripheral speed of the drum must equal the lineal speed at which the sheet is moving therebeneath. To this end, means are provided to rotate the drum about its axis at the proper angular speed relative to the lineal speed of the conveyor advancing the sheets to be marked past the drum.

In addition, when more than one printing area is provided in the outer periphery of the drum, the angle through which the drum is rotated is such as to place the desired number of marks on each sheet passing beneath the drum. As mentioned above, it is usually desired to place one mark on each sheet of glass. Therefore, the drum is rotated through an angular displacement sufficient to bring one marking area only into contact with each sheet of glass.

The desired rotation is accomplished through the medium of a plurality of motion actuating levers 85 (FIG. 4) pivoted on shoulder screws 86 secured to the mounting plate 75.

The axes of the screws 86 and therefore the turning loci of the levers 85 are arranged in equally and radially spaced relation to one another and the arcuate spaced distance therebetween is determined by the number of stenciling and/or printing areas 35 arranged about the circumference of the drum 33. For purposes of illustration, six such areas and levers 85 are herein shown and will be described.

Each lever 85 is formed with an apertured head 87 through which the related screw 86 is passed and a body 88 which is defined by a straight edge 89, the plane of which passes through the axis of screw 86, and oppositely disposed curved edge 90 which joins with edge 89 at rounded tip 91. The body 88 serves substantially as a weighted portion of the lever so that as each succeeding lever moves to its operative position it will automatically swing downwardly whereby the straight edge 89 thereof is disposed in a vertical plane. Also, since each lever is freely swingable, restricting means is provided for limiting the extent of swinging movement thereof in either direction as the drum rotates.

As hereinabove mentioned, the plate 75, on which the several levers 85 are mounted, is rotatably adjusted relative to the wall 68 upon loosening of wing-nuts 82. It will thus become apparent that by so rotating the plate 75, the position of the levers can be adjusted with reference to the marking area 35 associated therewith. Accordingly, the lineal distance $a$ of FIG. 13 can be lengthened or shortened by adjustment of the plate 75 to bring the circumferential distance $g$ in FIG. 8 into equality with the predetermined lineal distance $a$. Once this adjustment has been obtained and the wing-nuts 82 retightened, engagement of a lever 85 by the leading edge of a glass sheet will cause the marking member 32 to be rotated through the distance $g$ as the sheet is moved the distance $a$ to locate a marking area 35 in position to effect the printing or marking operation within the distance $c$ of FIG. 13.

As viewed in FIG. 4, the levers 85 in sequence are brought to a depending position as indicated at $e$ to be engaged at the edge 92 by the leading edge of a glass sheet 28 as it is carried forwardly by the conveyor 25. As the sheet is moved forwardly, the lever is urged against a stop pin 95 secured in the plate 75 while certain of the other levers will be swung about their respective axis to engage a stop pin 96. With the drum rotating clockwise or in the direction of the arrow designated by the numeral 97 in FIG. 4, the disengaged levers 85 will rest against their related stop pins 96 until they are carried through a vertical plane when the weight of body 88 will cause them to each swing into engagement with an opposed stop pin 95. As the leading edge 92 of the glass sheet engages the edge 89 of the lever $f$, the movement of the sheet will swing the lever forwardly to bring the edge 90 thereof against stop pin 95 and continued movement of the sheet will rotate the drum in a clockwise direction to bring a marking or printing area 35 on the drum into contact wtih the glass sheet as it passes therebeneath.

Referring particularly to FIGS. 3, 7, 8 and 9, the stencil areas 35 in band 34 in one embodiment of the invention, are of the silk-screen type and are generally centered in registration with rectangular openings or slots 100 provided in equally spaced relation in the peripheral wall 66 of drum 33 and being separated from one another by web portions 101 of said wall. Each slot is defined by a leading beveled edge 102, oppositely disposed side edges 103 and a following beveled edge 104. As seen in FIGS. 7 and 8, the beveled edge 102 provides a surface inclined downwardly toward the outer surface of wall 66 while the beveled edge 104 provides an oppositely disposed surface inclined at an upward angle.

A supply of ink is contained in the drum and is forced by a squeegee 105 through the openings in the silk-screen to print the desired marking on the glass sheet. For this purpose, a block 106 is supported on shaft 38 within the drum 33 and between the walls 68 and 70 and is provided in its lower end with a vertically disposed chamber 107 for receiving the squeegee 105. As shown in FIG. 7, the block 106 is supported in fixed relation to the shaft 38 by means of a key 108 and is dimensioned to afford a relatively close sliding fit with inner surfaces of drum walls 66, 67 and 68 and plate 70 thereby confining a supply of ink, indicated at 109 in FIG. 9.

The squeegee 105 is slidably confined in the chamber 107 of block 106 and is urged outwardly by springs 110 to locate the chamfered end 111 thereof in bearing engagement with the inner surface 112 of wall 66. The squeegee is equal in width to each of the rectangular slots 100 in said wall. Accordingly, as the drum 33 is rotated, the inner surface 112 of wall 66 will move beneath the bottom surface 113 of the block 106 and the chamfered squeegee edge 111 will be urged outwardly by springs 110 against the surface 112 as shown in FIGS. 7 and 8.

As an opening 100 in wall 66 passes beneath the surface 113 of block 106, the chamfered edge 111 of the squeegee will descend on the beveled surface 102 and will be urged by the springs 110 into active engagement with the inner surface of the silk screen band 34 thereby forcing ink through the stencil area 35 therein to print the marking on the glass sheet. Since the ends of the squeegee closely interfit with the edges 103 of the opening 100, the ink will be confined in the actual printing area. Thereafter the squeegee 105 is moved upwardly against the action of the springs 110 as the edge 111 engages the beveled surface 104 until each edge again is in engagement with the wall surface 112 in the vicinity of a web portion 101.

Figure 9:
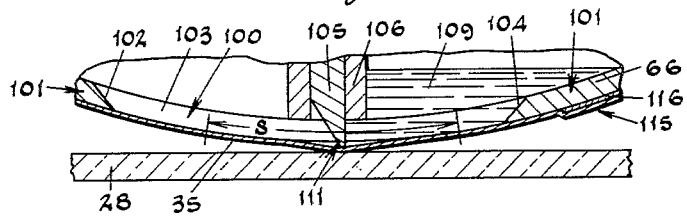
FIG. 9 is an enlarged detail view taken on line 9—9 of FIG. 3.

As indicated in FIG. 9, the outer surface of the band 34 is spaced a slight distance above the glass surface and the wiping edge of the squeegee depresses the band in the effective stencil area to the end that a tautness is developed in the band to raise the same from the glass surface immediately after the ink has been dispersed through the openings of the stencil area.

At this time, it is to be pointed out that the term "ink" is used broadly and is not intended to be restrictive; the selected printing ink or solution thereof being of any desired composition and color. Essentially, the inks or printing solutions to be employed for the purposes of this invention should be of the type containing a glass frit material or an enamel adapted to fuse to the glass surface with a resulting permanence and abrasion resistant properties. Such glass frit materials are also selected from particular compositions known to cure in a range of relatively high temperatures, as between 1000° and 1200° F., which are compatible to the temperature to which glass must be raised prior to tempering. One example of suitable printing materials is Glass Enamel Satin Etch TE–80 prepared by Pemco Corporation, Baltimore, Maryland. Also, the ink material should be of a suitable viscosity for free-flowing to afford thorough application of the same with a resulting thickness of approximately .0005 to .0008 of an inch. Tests indicate that fired-on frit materials of these thicknesses do not act abrasively to scratch the surface of an adjacent glass sheet when they are packaged for shipment with a relatively thin separator material therebetween.

This invention also contemplates the alternative use of stencil ink materials that can be applied either at relatively low temperature or those which flow more readily under the influence of heat. Known stenciling inks of the former character usually are mixed with a liquid base or oil that dries relatively slowly. On the other hand, where metal screens are used, the ink compositions include a thermoplastic medium requiring heat to become free-flowing but which solidify or "set-up" more rapidly, thereby reducing the tendency for the inks forming the individual legends of an emblem to "run" together to blur the appearance and clarity of the emblem when cured. The invention thus contemplates the inclusion of various compositions of ink or glass-frit materials; it being understood that while the band 34 is of the silk-screen type, it can also be provided as a metal band or perforated screen in which event the printing device 32 would be suitably constructed and equipped with heating devices for this purpose.

As mentioned above, the position of the stencil or printing areas 35 as provided in the band 34 is also established in accordance with the position in which the legend or emblem is to be applied to a glass sheet and this can be determined by the size and/or shape of the sheet and as they are arranged in relation to one another on the loading conveyor 25. Also, one or more apparatus 30 can be located transversely across the width of the conveyor to simultaneously operate on a like number of transversely disposed glass sheets, although only one apparatus has been discussed in this connection. As herein disclosed, the stencil areas 35 are located in parallel with the linear dimension of the band 34 or the longitudinal path of travel of the conveyor 25 or the glass sheets thereon. Alternately, the stencil areas 35 can be located with equal advantage in transverse relation; such positioning being dependent on the preferred arrangement of the emblem relative to a particular edge or area of the glass sheet.

Figures 10, 11, 12:
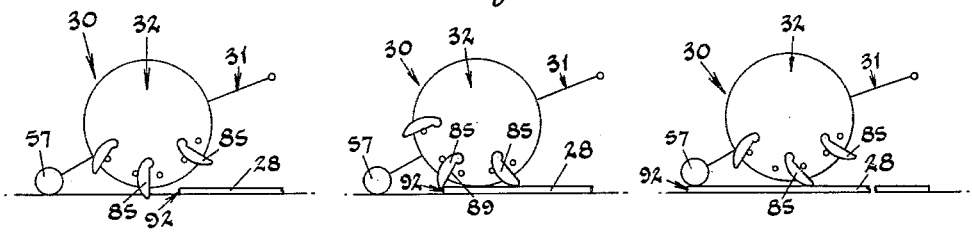
FIGS. 10, 11 and 12 illustrate progressive steps of the marking operation.

In actual practice and as illustrated diagrammatically in FIGS. 10, 11 and 12, a glass sheet 28 is carried forwardly on the conveyor 25 toward the marking apparatus 30. At this time, the roller 57 is rotatably carried on the moving conveyor and, through the frame 31, is supporting the drum 33 so that the lower sector thereof is properly spaced above the surface of the conveyor and, more particularly, the actual distance to be established between the surface of the active stencil area and the surface of the glass sheet. Now, as the leading edge 92 of the glass sheet contacts the edge 89 of the immediate lever 85, the sheet forces the edge 90 of the lever against stop pin 95 with resulting rotation of the drum 33 about the axis of shaft 38. During rotation of the drum 33 and more especially the stencil area 35 in active contact with the surface of the sheet as viewed in FIGS. 9 and 11, the desired indicia will be applied thereto. When the drum 33 has carried the stencil area out-of-contact with the glass surface, means is herein provided to slightly raise the surface of the drum from the surface of the sheet while still maintaining tractive rotation therewith. For this purpose, as indicated at 115, FIGS. 7, 8 and 9, a thin plate 116 is inserted between the surfaces of the wall 66 of drum 33 and the stencil band 34. The position of the thin plate and the width thereof is determined by the full extent of rotary movement required to bring the next lever 85 into position for engagement with a subsequent sheet of glass. The effective action of the raised area created by the plate is in advance of the lifting action of the roller 57 as it is engaged by the leading edge of the sheet and rides onto the surface thereof as shown in FIG. 12. As herein disclosed, the next lever 85 is supported in sliding engagement with the glass surface and the axis of the shoulder screw 86 is in the vertical plane through the axis of shaft 38. Thus, the drum 33 is bodily raised by the frame 31, through the roller 57, out of contact with the surface of the sheet 28 and is properly positioned so that upon engagement of said next lever 85, the related stencil area 35 will likewise be positioned to apply the indicia in the desired area of the sheet. Obviously, when the roller 57 drops off the following edge of the sheet, the marking apparatus 30 will be again positioned above the conveyor 25 as shown in FIG. 10 and with the lever 85 dropping into a vertical position wherein it is engaged by a subsequent sheet of glass.

Figure 14:
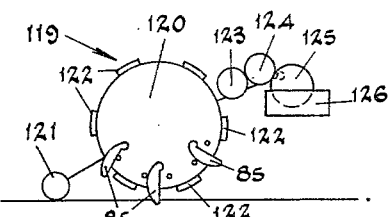
FIG. 14 is a side view of a modified form of marking apparatus.

While the present invention has been described in detail with regards to screen-type stenciling apparatus, it will be appreciated that it is not intended in any way to limit the invention to such apparatus. For example, it is also contemplated that the marking member 32 can be equipped with conventionally prepared rubber stamps that will transfer the identifying indicia in the usual manner of contact printing. Referring now to FIG. 14, there is shown a modified form of marking apparatus generally designated by the numeral 119. As therein disclosed, the drum 120 is supported by a frame 121 in the same manner as hereinbefore described in connection with the member 32 and the frame 31 equipped with a roller 57 to carry the same relative to the conveyor 25. The drum 120 is provided with spaced rubber stamps 122 which are made with suitable characters to apply the desired legends typically as shown in FIG. 10. The rubber stamps 122 are adapted to be rotated in contact with an inking roll 123. Roll 123 conventionally receives a supply of ink from transfer roll 124 which is in engagement with roll 125 of ink reservoir 126. Rolls 123, 124 and 125 with reservoir 126 may be mounted on the structure of the furnace in any suitable manner. The drum 120 of modified apparatus 119, and equipped with levers is adapted to apply the designed legends or design as shown in connection with the marking apparatus 30 and as fully shown in FIGS. 10, 11 and 12.

It is to be understood that the forms of the invention herewith shown and described are to be taken as illustrative embodiments only of the same, and that various changes in the shape, size and arrangement of parts may be resorted to without departing from the spirit of the invention.

We claim:
1. In apparatus for marking articles carried along a predetermined path by a conveyor, a structural framework disposed above said conveyor, an elongated arm pivoted at one end to said framework to swing toward and away from said conveyor about a fixed axis extending transversely across said path and parallel to said conveyor, a cylindrical drum journaled adjacent to the free end of said arm to rotate about an axis parallel to said fixed axis, a second arm having one end secured to the free end of the first arm and its other end free, said second arm being inclined downwardly and forwardly toward said conveyor, a roller journaled on the free end of said second arm in rolling engagement with said conveyor, a plurality of printing members angularly spaced apart around the outer periphery of said drum, means rotating said drum through a preselected angular displacement as an article is advanced therebeneath by said conveyor thereby to move one of said printing members into surface engagement with said article and to position another of said printing members to be moved into contact with a succeeding article moving along said path, said roller being adapted to roll over an article marked by said drum thereby to swing said second axis upwardly about said fixed axis to move said drum away from said path.

2. For use in placing an identifying mark on each of a plurality of articles moving successively along a predetermined path in a given plane, a marking apparatus disposed adjacent said path and comprising a structural framework disposed above said path, an arm pivoted at one end on said framework to project forwardly along said path and to swing toward and away from said path about a fixed axis extending transversely across said path and parallel to said plane, a drum journaled adjacent the free end of said arm to rotate about a second axis parallel to said fixed axis, said drum being carried by said arm over said path with the outer periphery thereof in rolling engagement with said articles moving along said path, a second arm having one end secured to the free end of the first arm and its other end free, said second arm being inclined downwardly and forwardly toward said conveyor, a roller journaled on the free end of said second arm in rolling engagement with said conveyor, a plurality of printing members angularly spaced apart and secured to the outer periphery of said drum, said roller being adapted to roll over an article marked by said drum thereby to swing said second axis upwardly about said fixed axis to move said drum away from said path, and a plurality of levers pivoted on said drum between said printing members to swing between a first position wherein said levers project radially outwardly beyond the periphery of said drum toward said path and a second position wherein said levers project a lesser distance beyond the outer periphery of said drum, said levers when in said first position and with said roller in rolling engagement with said conveyor, being engaged by the leading edge of an article moving along said path and pushed by the latter to rotate said drum and move one of said printing members into printing engagement with said article, a succeeding lever swinging from said second position to said first position after the marked article moves past said drum thereby to be engaged by a succeeding article.

3. Apparatus for marking articles as defined in claim 1, including means for adjusting the angular position of said second arm relative to said first named arm to thereby locate said roller with reference to said drum so as to pass a predetermined length of glass sheet beneath said drum before said second axis is swung upwardly about said fixed axis to move said drum away from said path.

4. In apparatus for marking articles moving along a predetermined path in a given plane, a frame disposed above said path, a cylindrical drum disposed above said path with the outer periphery thereof adapted to be placed in surface engagement with said articles moving along the path, means journaling said drum on said frame to rotate about an axis extending transversely across said path and parallel to said given plane, a plurality of printing members angularly spaced apart around the outer periphery of said drum, a plurality of levers mounted on said drum and extending outwardly beyond the periphery thereof, each of said levers corresponding to one of said printing members whereby the leading edge of each of said articles advancing along said path is engaged by one of said levers to rotate said drum and move one of said printing members into printing engagement with said article, and means for raising said drum out of contact with said article upon completion of the printing thereon until the printed article passes out of the printing zone and then lowering said printing drum with the next succeeding lever in position to engage the next of said articles.

5. In apparatus for marking articles carried along a predetermined path by a conveyor, a structural framework disposed above said conveyor, an elongated arm pivoted at one end to said framework to swing toward and away from said conveyor about a fixed axis extending transversely across said path and parallel to said conveyor, a cylindrical drum journaled adjacent the free end of said arm to rotate about an axis parallel to said fixed axis, a second arm having one end secured to the free end of the first arm and its other end free, said second arm being inclined downwardly and forwardly toward said conveyor, a roller journaled on the free end of said second arm in rolling engagement with said conveyor, a plurality of printing members angularly spaced apart around the outer periphery of said drum, a plurality of levers mounted on said drum and extending outwardly beyond the periphery thereof, each of said levers corresponding to one of said printing members whereby the leading edge of each of said articles advancing along said path on said conveyor is engaged by one of said levers to rotate said drum and move one of said printing members into printing engagement with said article, said roller being adapted to raise said drum out of contact with said article upon completion of the printing thereof until the printed article passes out of the printing zone and then lower said printing drum with the next succeeding lever in position to engage the next of said articles.

References Cited by the Examiner

UNITED STATES PATENTS

| 1,541,787 | 6/1925 | Cadgene | 101—120 |
| 1,611,679 | 12/1926 | Rees | 101—35 |
| 1,804,801 | 5/1931 | Panabaker | 101—35 |
| 2,172,318 | 9/1939 | Ferguson | 101—35 |
| 2,195,135 | 3/1940 | Serai | 101—35 |
| 2,571,064 | 10/1951 | Schaefer | 101—120 |
| 2,595,279 | 5/1952 | McKay | 101—35 |
| 2,674,939 | 4/1954 | Brengman | 101—35 |

WILLIAM B. PENN, *Primary Examiner.*